United States Patent [19]

Louison et al.

[11] Patent Number: 4,995,177
[45] Date of Patent: Feb. 26, 1991

[54] LAUNDRY-IRON SOLE-PLATE FORMED BY ASSEMBLING TOGETHER A PLURALITY OF METAL SHEETS BRAZED TO EACH OTHER

[75] Inventors: Bernard Louison, Chauanay; Camille Burton, Villefranche s/Saone, both of France

[73] Assignee: SEB S.A., Selongey, France

[21] Appl. No.: 459,303

[22] Filed: Dec. 29, 1989

[30] Foreign Application Priority Data

Jan. 4, 1989 [FR] France ................................ 89 00049

[51] Int. Cl.⁵ ...................... D06F 75/00; D06F 75/14; D06F 75/38; D06F 75/18
[52] U.S. Cl. .......................................... 38/88; 38/74; 38/77.5; 38/85; 38/89; 38/93
[58] Field of Search ...................... 38/16, 66, 74, 77.5, 38/85, 88, 89, 93, 77.3, 77.83, 90, 82

[56] References Cited

U.S. PATENT DOCUMENTS

| | | | |
|---|---|---|---|
| 2,027,767 | 1/1936 | Deems | 38/77.83 |
| 2,138,720 | 11/1938 | Wright | 38/74 |
| 2,257,451 | 9/1941 | Barnes | 38/93 X |
| 2,475,571 | 7/1949 | Schreyer | 38/90 X |
| 2,588,747 | 3/1952 | Morton | 38/77.83 |
| 2,781,593 | 2/1957 | Schreyer | 38/90 X |
| 2,819,543 | 1/1958 | Hoecker | 38/77.5 |
| 2,846,793 | 8/1958 | Studer | 38/93 X |
| 3,852,899 | 12/1974 | Mackey | 38/77.83 X |
| 4,277,900 | 7/1981 | Gowdy | 38/77.83 |
| 4,636,613 | 1/1987 | De La Morandiere | 38/82 X |
| 4,658,520 | 4/1987 | Henneberger | 38/77.83 X |
| 4,716,276 | 12/1987 | Moteci | 38/77.3 X |

FOREIGN PATENT DOCUMENTS

| | | |
|---|---|---|
| 676919 | 7/1966 | Belgium . |
| 0111445 | 6/1984 | European Pat. Off. . |
| 0202969 | 11/1986 | European Pat. Off. . |
| 2151860 | 5/1972 | Fed. Rep. of Germany . |
| 1431164 | 1/1966 | France . |
| 2628283 | 9/1989 | France . |

*Primary Examiner*—Werner H. Schroeder
*Assistant Examiner*—Ismael Izaguirre
*Attorney, Agent, or Firm*—Young & Thompson

[57] ABSTRACT

A steam-iron sole-plate comprises a first plate constituting the sole-plate proper and provided with a roll-bonded layer of brazing alloy, a second plate constituting the steam chamber and provided with a roll-bonded layer of brazing alloy and a flat resistance heating element inserted between the two plates and separated from these latter by insulating layers. The two plates are assembled together by means of a fluid-tight peripheral brazed joint and a series of brazed joints at the level of bosses formed on the second plate.

9 Claims, 3 Drawing Sheets

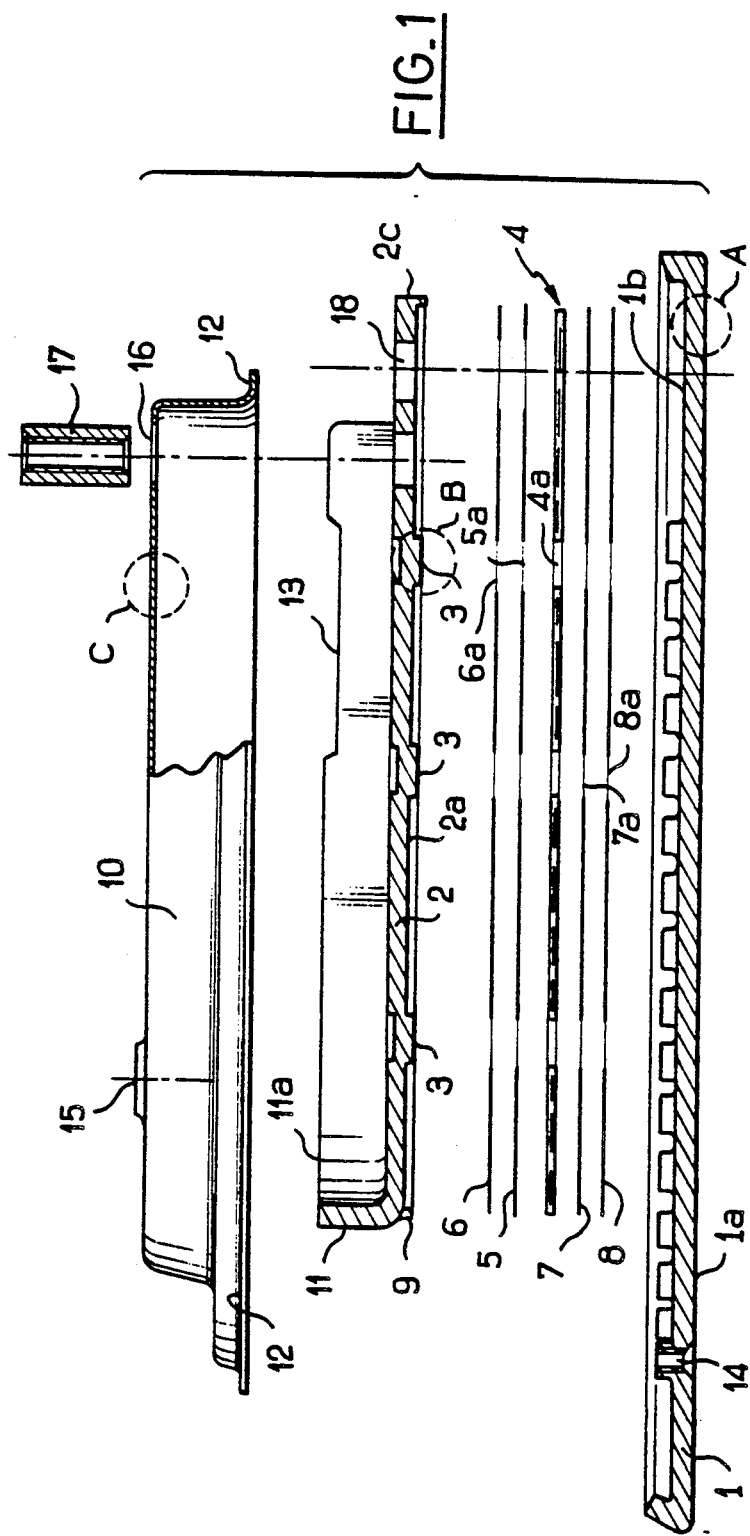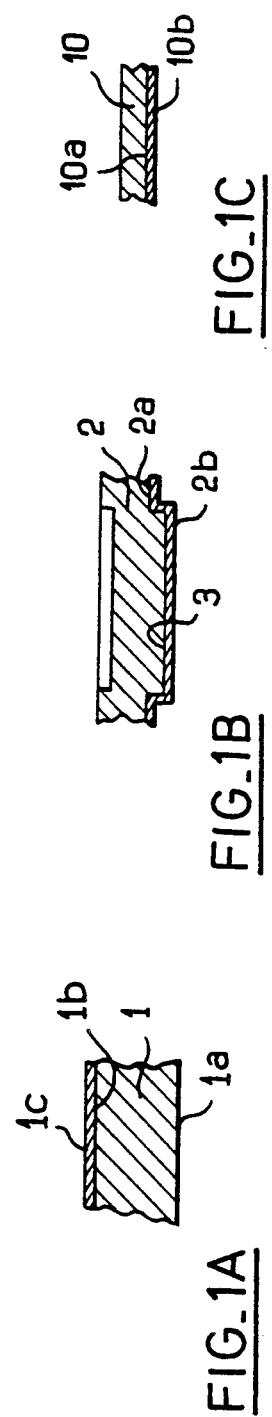

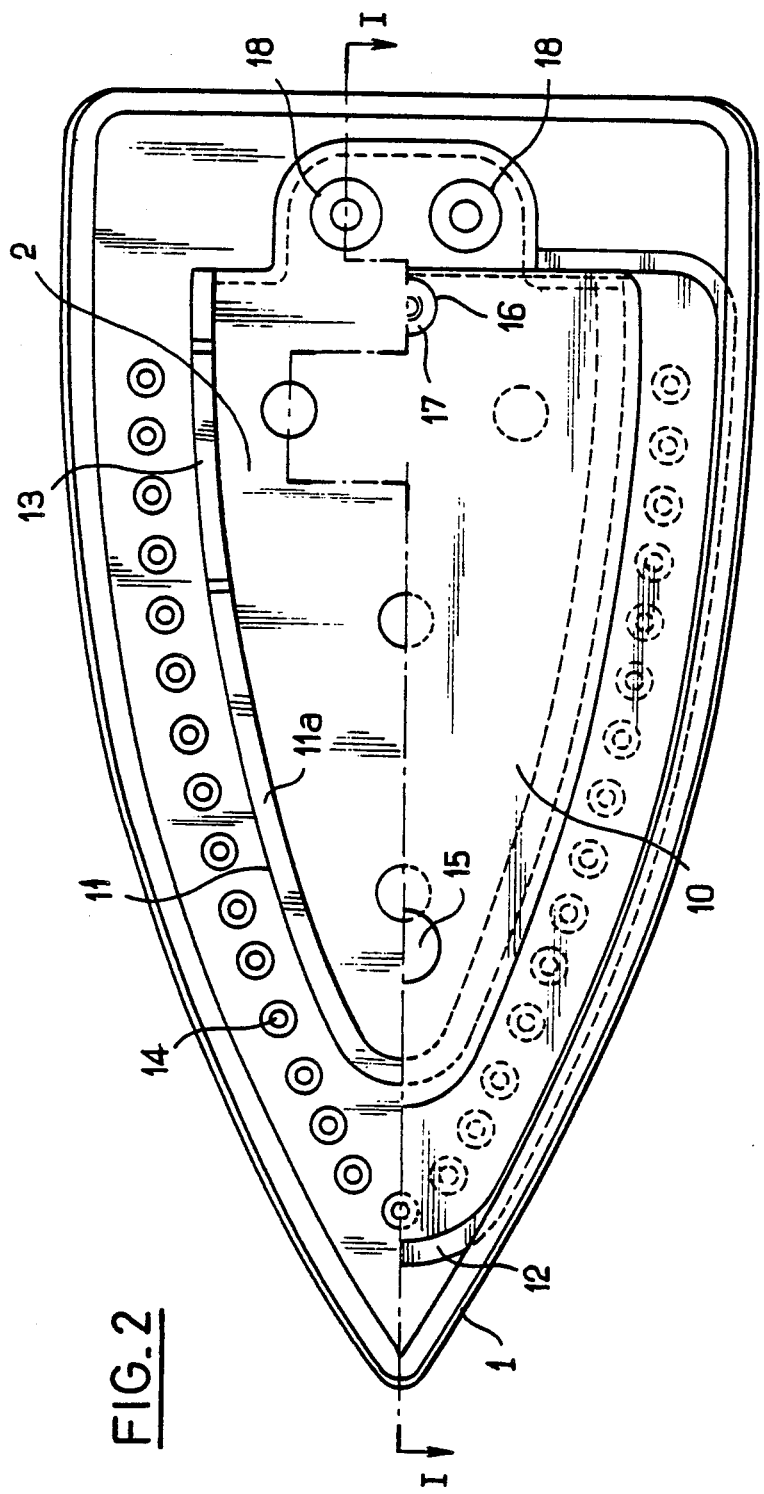
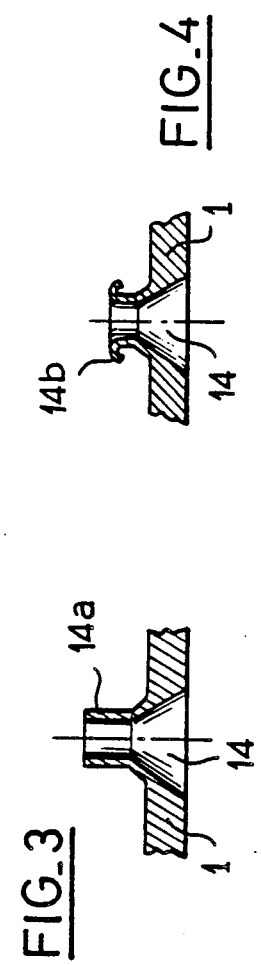
FIG. 2
FIG. 3
FIG. 4

LAUNDRY-IRON SOLE-PLATE FORMED BY ASSEMBLING TOGETHER A PLURALITY OF METAL SHEETS BRAZED TO EACH OTHER

BACKGROUND OF THE INVENTION

1. Field of the Invention

The present invention relates to a steam-iron sole-plate formed by assembling together a plurality of metal sheets brazed to each other, a flat resistance-type heating element being placed between two of said sheets.

2. Description of the Prior Art

Laundry irons which are currently available on the market have a heating resistor which is insulated from the frame ground of the appliance by an insulating layer designated by NF standards as a "principal functional insulator". This insulator can be a coating of magnesia in the case of a screened resistor, a sheet of micanite in the case of a clamped flat heating element, etc. Accordingly, the power supply cord must have a ground lead in addition to the current supply leads. These appliances are designated as Class I. The three leads just mentioned require a cord of large diameter and, if it is desired to use a cord winder, this storage device will have to be bulky, thus resulting in excessive costs.

European as well as American and Japanese standardization allows suppression of the ground lead if insulation of the resistor with respect to the ground of the appliance is achieved by an insulating layer of 1 mm, or by two superposed and separable insulating layers in addition to the principal insulation, namely three layers on each side of the heating element. These appliances are in this case designated as Class II. The power supply cord need have only two lead wires, thus making it possible to mount cord winders of small overall size.

The aim of the present invention is to produce a sole-plate for a steam or dry iron of Class II at a highly competitive cost price without any modification of the thermal properties of the iron. In fact, since the presence of an insulator having a thickness of 1 mm on each side of the heating element has the effect of considerably braking the transmission of heat, it is possible to employ sheets of micanite having a thickness of 0.1 mm, the electrical rigidity of which conforms to the prescribed standard (2500 volts). By virtue of their small thickness, these sheets of micanite have the property of being transparent to infrared radiation. Moreover, although the prescribed standard makes it necessary to double the number of insulators between the functional insulator and ground, the resulting thickness of 0.2 mm constitutes only a negligible brake for transmission of heat by conduction.

It should be noted that the total thickness of the heating element and of the four insulating sheets is 1 mm±0.1, namely 0.5 mm±0.05 between the heating element and the mass of metal to be heated.

The present Applicant has described in his French patent Application No. 88 02625 filed on Mar. 2nd, 1988 a flat heating component comprising a resistance-type heating element embedded in electrically insulating material and placed between two metal plates secured to each other by means of a series of welded joints made through gaps formed in the heating element. These welded joints are made by brazing which is obtained by melting a sheet of brazing alloy roll-bonded with either or both of the two metal plates.

SUMMARY OF THE INVENTION

The object of the present invention is to apply the teachings of the aforementioned French patent Application to the construction of a laundry-iron sole-plate which satisfies the conditions set forth in the foregoing.

In accordance with the invention, said laundry-iron sole-plate essentially comprises:

a first plate constituting the sole-plate and having a face which is intended to come into contact with the textile article to be ironed, said first plate being formed by die-stamping a sheet of aluminum provided on the face opposite to the face aforesaid with a roll-bonded layer of brazing alloy, a second plate constituting the bottom wall of the steam chamber and formed by die-stamping an aluminum sheet provided on the face adjacent to the first plate with a roll-bonded layer of brazing alloy, as well as with a series of bosses in contact with said face of the first plate which is provided with a roll-bonded layer of brazing alloy, a flat resistance heating element inserted between the two plates aforesaid and separated therefrom by electrically insulating layers, the bosses of the second plate being engaged in gaps formed in said heating element and said insulating layers, the two plates being assembled together by means of a peripheral fluid-tight brazed joint and a series of brazed joints formed at the level of the bosses.

The resistance heating element is thus located between two plates assembled together in fluid-tight manner, with the result that said element is not liable to be put in contact with water or steam.

The invention thus makes it possible to construct a Class II laundry iron at a reasonable cost.

In a preferred embodiment of the invention, the sole-plate is provided in addition with a steam chamber closure plate formed by die-stamping an aluminum sheet provided on the face opposite to the second plate with a rolled-bonded layer of brazing alloy, said closure plate being attached by brazing to the other two plates at the same time as these latter.

The fact that this closure plate is brazed to the other two plates at the same time as these latter guarantees excellent fluid-tightness of the steam chamber and permits large-scale production at very low cost.

Preferably, the outer edge of the second plate completely surrounds the electric heating element, said edge being connected to the first plate in fluid-tight manner by means of a peripheral brazed joint.

Preferably also, the outer edge of the second plate also surrounds the power supply contacts of the resistance heating element.

To this end, the second plate is provided with passages in which are engaged the power supply contacts applied against the resistance heating element.

Preferably, the passages aforesaid are sealed-off by means of members which isolate the supply contacts.

Said supply contacts are thus perfectly isolated and water or steam is not liable to penetrate into the space provided between the first and second plates.

BRIEF DESCRIPTION OF THE DRAWINGS

FIG. 1 is an exploded sectional view taken along line I—I of FIG. 2 and showing a steam-iron sole-plate in accordance with the invention.

FIG. 1A is an enlarged view of the detail A of FIG. 1.

FIG. 1B is an enlarged view of the detail B of FIG. 1.

FIG. 1C is an enlarged view of the detail C of FIG. 1.

FIG. 2 is a top view of the sole-plate, in which the top half-view shows the sole-plate without closure cover and the bottom half-view shows the cover in position on the sole-plate.

FIG. 3 is a sectional view of an orifice for the flow of steam through the sole-plate, formed by extrusion prior to the upsetting operation.

FIG. 4 is a sectional view of the completed orifice for the flow of steam, after upsetting of its cylindrical collar.

DESCRIPTION OF THE PREFERRED EMBODIMENTS

Figure 1D:
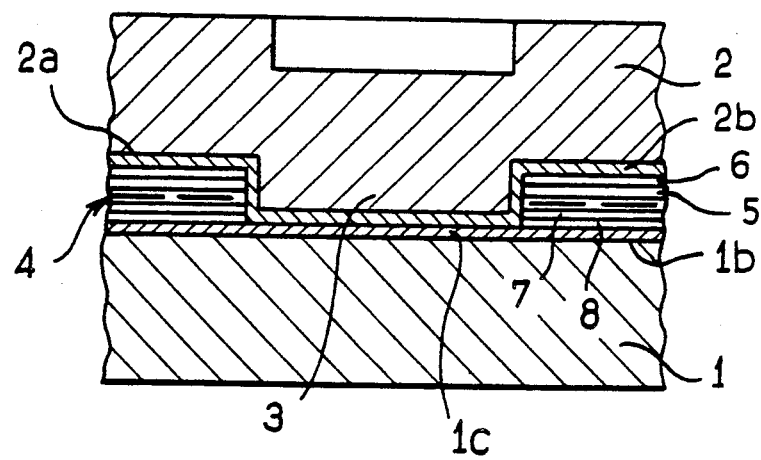
FIG. 1D is an enlarged view of the zone B, the two plates being in contact with each other, prior to the brazing operation.

In the embodiment of FIG. 1, the steam-iron sole-plate in accordance with the invention comprises:

a first plate 1 constituting the sole-plate proper and having a face 1a which is intended to come into contact with the textile article to be ironed. The sole-plate is formed by die-stamping an aluminum sheet provided on the face 1b opposite to the face 1a aforesaid with a roll-bonded brazing alloy 1c (see FIG. 1A) ;

a second plate 2 constituting the bottom wall of the steam chamber and formed by die-stamping an aluminum sheet provided on its face 2a adjacent to the first plate with a roll-bonded layer of brazing alloy 2b (see FIG. 1B). Said second plate 2 also has a series of bosses 3 (see also FIG. 1B) obtained by semicutting, in contact with the face of the first plate 1 which has a roll-bonded layer 1c of brazing alloy.

The sole-plate is provided in addition with a flat resistance heating element 4 which will be described in detail below, said element being inserted between the two plates 1, 2 aforesaid and separated from these latter by electrically insulating layers 5, 6, 7, 8.

When the two plates 1, 2 are applied against each other, the semicut bosses 3 of the second plate 2 are engaged in gaps 4a, 5a, 6a, 7a, 8a formed in the heating element 4 and in the insulating layers 5, 6, 7, 8 (as shown in FIG. 1D).

Said two plates 1, 2 are assembled together by means of a peripheral fluid-tight brazed joint and a series of brazed joints formed at the level of the bosses 3.

The peripheral brazed joint is formed between a projecting rib 9 adjacent to the outer edge of the plate 2 and the face 1b of the first plate 1.

By virtue of the fact that the two plates 1, 2 are provided on their opposite faces with a roll-bonded layer of brazing alloy, it is only necessary to heat the assembly, for example within a vacuum enclosure, to a sufficient temperature to melt the brazing alloy. In regard to the choice of brazing alloy, reference will be made to the description of French patent Application No. 88 02265.

In the embodiment shown in FIGS. 1 and 2, the sole-plate is provided in addition with a steam-chamber closure plate or cover 10 formed by die-stamping an aluminum sheet provided on its face 10a located opposite to the second plate 2 with a roll-bonded layer 10b (see FIG. 1C) of brazing alloy. Said closure plate 10 is attached by brazing to the other two plates 1, 2 at the same time as these latter.

Thus in order to assemble the plates 1, 2, 10, it is only necessary to apply them against each other and to heat the assembly in order to melt the brazing alloy of the roll-bonded layers 1c, 2b and 10b.

When this brazing operation is being performed, a fluid-tight joint is formed on the one hand between the peripheral rib 9 of the plate 2 and the face 1b of the plate 1 and on the other hand between the bottom face 10a of the closure plate 10 and the top edge 11a of the lateral wall 11 of the plate 2 as well as between the peripheral flange 12 of the closure plate 10 and the surface of the plate 1.

The top edge 11a of the lateral wall of the plate 2 has a recess 13 which enables the steam formed within the steam chamber to escape to the exterior through the orifices 14 formed in the plate 1.

The top wall of the closure plate 10 has a hole 15 for passing the water flow device into the steam chamber. Fluid-tight attachment of said device can also be carried out by brazing at the same time as the brazing operation performed between the other parts of the sole-plate.

The top wall of the closure plate 10 is provided in addition with a second hole 16 for the attachment of a sleeve 17 for fixing the heat-regulating thermostat of the iron. Fluid-tight attachment of the sleeve 17 can also be carried out as indicated earlier.

The steam chamber is thus made completely fluid-tight with the exception of the recesses 13 for the flow of steam.

Owing to the presence of the layer of brazing alloy on the inner face 1b of the sole-plate 1 and to the fact that the steam orifices 14 are obtained by extrusion (see FIG. 3), the outer face of the tube 14a also has a layer of brazing alloy. At the time of melting, since the brazing alloy has a very high wetting capacity, it rises within the distal portion of the tube 14a and fills the hole 14. In order to overcome this disadvantage (which makes it necessary to re-machine the blocked orifices), the free edge of the tube 14a is upset so as to form an annular flange 14b (as shown in FIG. 4). The brazing alloy is then no longer capable of passing beyond the distal zone.

Fluid-tightness of the assembly consisting of heating element 4 and insulating layers 5 to 8 is obtained by the fact that the rib 9 formed at the periphery on the outer face of the steam chamber 2 is in contact with the inner face of the sole-plate 1 and is brazed to this latter at all points. The only zones in contact with the atmosphere on completion of the brazing operation are the passages 18 provided for the power supply contacts of the resistance heating element 4.

It is apparent in particular in FIG. 1 that the outer edge 2c of the second plate 2 surrounds both the heating element 4 and the insulating layers 5 to 8 as well as the passages 18 provided for the power supply contacts of the resistance heating element 4.

Figure 5:
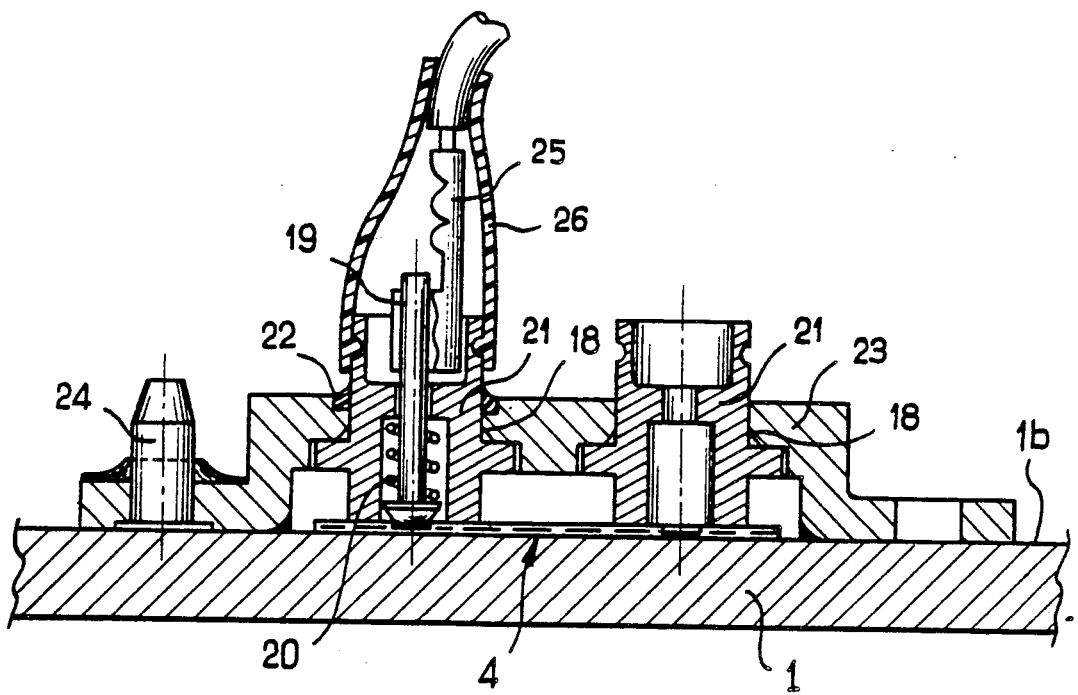
FIG. 5 is a transverse sectional view of the sole-plate at the level of the power supply terminals of the resistance heating element.

In FIG. 5, it is apparent that the power supply contacts 19 are engaged within the passages 18 and are in contact with the metal of the resistance heating element 4 under the force exerted by a spring 20.

In this figure, it is also apparent that the passages 18 are sealed-off by means of insulating sleeves 21 which surround the power supply contacts 19.

Fluid-tightness is achieved by means of a seal 22 of silicone resin. Insulating sleeves 21 are forcibly engaged within the passages 18 and maintained applied against the bottom wall of the steam chamber by a stirrup-piece 23 which is secured to the sole-plate 1 by means of clips engaged in bosses 24 attached to said sole-plate.

Electrical connection with the contacts 19 is established by means of cable terminals 25. An insulating hood 26 ensures fluid-tightness between the insulating sleeves 21 and the conducting wires which are connected to the power supply system.

In the example of construction shown in FIG. 1, the resistance heating element is electrically isolated from the first and second plates 1, 2 on each side by means of two superposed and separable sheets of micanite and by means of a sheet of micanite joined mechanically to the metal sheet of the heating element 4 and to the adjacent sheet of micanite 5 or 7. The different sheets of micanite have a thickness equal to 0.1 mm±0.02 mm.

In an alternative form of construction, the metal sheet of the heating element can be electrically isolated from the first and second plates 1, 2 on each side by means of three superposed and separable sheets of micanite.

It will be readily apparent that the invention is not limited to the examples of construction which have just been described and many modifications can be made in these examples without thereby departing either from the scope or the spirit of the invention.

What is claimed is:

1. A steam-iron sole-plate formed by assembling together a plurality of metal sheets brazed to each other and comprising a flat resistance heating element (4) between two of said sheets, wherein said sole-plate comprises :
   a first plate (1) constituting, the sole-plate and having a face (1a) adapted to come into contact with a textile article to be ironed, said first plate being formed by die-stamping a sheet of aluminum provided on the face (1b) opposite to the face aforesaid with a roll-bonded layer of brazing alloy (1c),
   a second plate (2) constituting the bottom wall of a steam chamber and formed by die-stamping an aluminum sheet provided on the face (2a) adjacent to the first plate (1) with a roll-bonded layer (2b) of brazing alloy as well as with a series of bosses (3) in contact with said face (1b) of the first plate (1) provided with a roll-bonded layer of brazing alloy,
   said flat resistance heating element (4) being inserted between the two plates aforesaid (1, 2) and separated therefrom by electrically insulating layers (5, 6, 7, 8), the bosses (3) of the second plate (2) being engaged in gaps (4a, 5a, 6a, 7a, 8a) formed in said heating element (4) and said insulating layers (5, 6, 7, 8),
   the two plates (1, 2) being assembled together by a peripheral fluid-tight brazed joint and a series of brazed joints formed at the level of the bosses (3).

2. A sole-plate according to claim 1, wherein said sole-plate is provided in addition with a steam chamber closure plate (10) formed by die-stamping an aluminum sheet provided on the face (10a) opposite to the second plate (2) with a roll-bonded layer (10b) of brazing alloy, said closure plate (10) being attached by brazing to the other two plates (1, 2) at the same time as the brazing of said other two plates.

3. A sole-plate according to claim 1 wherein the second plate (2) has an outer edge (2c) completely surrounding the resistance heating element (4), said edge being connected to the first plate in fluid-tight manner by a peripheral brazed joint.

4. A sole-plate according to claim 3, wherein the outer edge (2c) of the second plate (2) also surrounds power supply contacts (19) of the resistance heating element (4).

5. A sole-plate according to claim 4, wherein the second plate (2) is provided with passages (18) in which are engaged the power supply contacts (19) applied to the resistance heating element (4).

6. A sole-plate according to claim 5, wherein the passages (18) are sealed-off by sealing members (21) which isolate the supply contacts.

7. A sole-plate according to claim 1, wherein the resistance heating element (4) is electrically isolated from the first and second plates (1, 2) on each side by two superposed and separable sheets of micanite (5, 6 ; 7, 8) and by means of a sheet of micanite joined mechanically to the heating element (3) and to the adjacent sheet of micanite (5 or 7).

8. A sole-plate according to claim 1, wherein the heating element (4) is electrically isolated from the first and second plates (1, 2) on each side by three superposed and separable sheets of micanite.

9. A sole-plate according to claim 1, wherein the first plate (1) has steam flow cannulus being pressed out of the aluminum sheet and each having an annular flange (14b) at a distal end thereof.

* * * * *